(12) United States Patent
Lan

(10) Patent No.: US 10,917,776 B1
(45) Date of Patent: Feb. 9, 2021

(54) TESTING GEOFENCED ALERTS

(71) Applicant: T-Mobile USA, Inc., Bellevue, WA (US)

(72) Inventor: Wei-Ming Lan, Morrisville, NC (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/588,656

(22) Filed: Sep. 30, 2019

(51) Int. Cl.
*H04W 4/00* (2018.01)
*H04W 4/90* (2018.01)
*H04W 4/029* (2018.01)
*H04W 4/021* (2018.01)

(52) U.S. Cl.
CPC ............ *H04W 4/90* (2018.02); *H04W 4/021* (2013.01); *H04W 4/029* (2018.02)

(58) Field of Classification Search
CPC ................................ H04W 4/90; H04W 4/021
See application file for complete search history.

(56) References Cited

U.S. PATENT DOCUMENTS

| | | | | |
|---|---|---|---|---|
| 2007/0296575 A1* | 12/2007 | Eisold | .................. | G08B 27/006 340/539.16 |
| 2009/0170530 A1* | 7/2009 | Kadavallur | ............. | H04W 8/22 455/456.3 |
| 2013/0226449 A1* | 8/2013 | Rovik | .................. | G01C 21/362 701/424 |
| 2014/0253372 A1 | 9/2014 | Davis et al. | | |
| 2014/0274125 A1* | 9/2014 | Sendonaris | ............... | G01S 5/02 455/456.1 |

FOREIGN PATENT DOCUMENTS

WO 2018204362 A2 11/2018

OTHER PUBLICATIONS

European Search Report dated Sep. 21, 2020, EU Application No. 20179027.6, filed Jun. 9, 2020.

* cited by examiner

*Primary Examiner* — Omoniyi Obayanju
(74) *Attorney, Agent, or Firm* — Lane Powell PC

(57) ABSTRACT

Systems and methods of testing the handling of, or response to, transmitted Wireless Emergency Alerts (WEA) that include a geofenced area. The testing can include providing first location Global Positioning System (GPS) signals to user equipment, causing the user equipment to determine it is geographically located at the first location. A WEA alert can be provided to the user equipment and the WEA can include a geofenced area that does not include the first location. The user equipment can be provided GPS signals corresponding to a second location that is within the geofenced area of the WEA. Verification can then be performed to check that the user equipment displays the WEA alert, or message, in response to the user equipment determining its geographical position as corresponding to the second location that is within the geofenced area.

14 Claims, 4 Drawing Sheets

TESTING GEOFENCED ALERTS

BACKGROUND

During emergency events, various information dissemination systems and methods have been developed to help inform people of the event, such as giving safety instructions or alerts to users within a region that could be affected by the emergency event. With the widespread adoption of mobile devices, such as cellular devices, one of the most effective ways to disseminate the information is to transmit, or push, that information to mobile devices within a defined geographic area. Oftentimes, the mobile devices are physically near the people who own or operate them, and those people receive the necessary emergency information in this way. Conventionally, the emergency alerts are targeted over a large area to ensure that the people affected by or needing to respond to the emergency alert receive the alert. However, this large scale approach can cause unnecessary panic or confusion since people who do not actually need to receive the alert may receive the alert and believe they need to take action. As such, communities and governments have focused efforts to provide more targeted alerts.

One way to target emergency alerts is to include a geofenced area in the alert, with the geofenced area being a geographical area defined by interconnected sets of coordinates or other features. An emergency alert system that includes a geofenced area for the alert ensures that those mobile devices that are determined to be within the defined geofenced area display the received alert and those outside the geofenced area do not. To achieve this, the alert can be widely transmitted over an area that includes the geofenced area. Devices that receive the alert can determine their position relative to the geofenced area and can output the alert only when the device has determined it is located within the geofenced area. However, users and devices may be moving and can transit into or enter the geofenced area after the initial transmission of the alert. In this situation, the device should determine that it is located within the geofenced area after arrival and display the alert.

Since the use of geofenced alerts provide an advantage over the widespread transmission of alerts and can provide vital information to people, it is important to test that the geofenced alerts are properly handled and output by devices. As such, there exists a need for systems and methods of testing geofenced alerts that does not require transmitting an active alert to the general public, which could cause confusion when there is not an actual emergency for which the alert is being transmitted.

DETAILED DESCRIPTION

Figure 1:
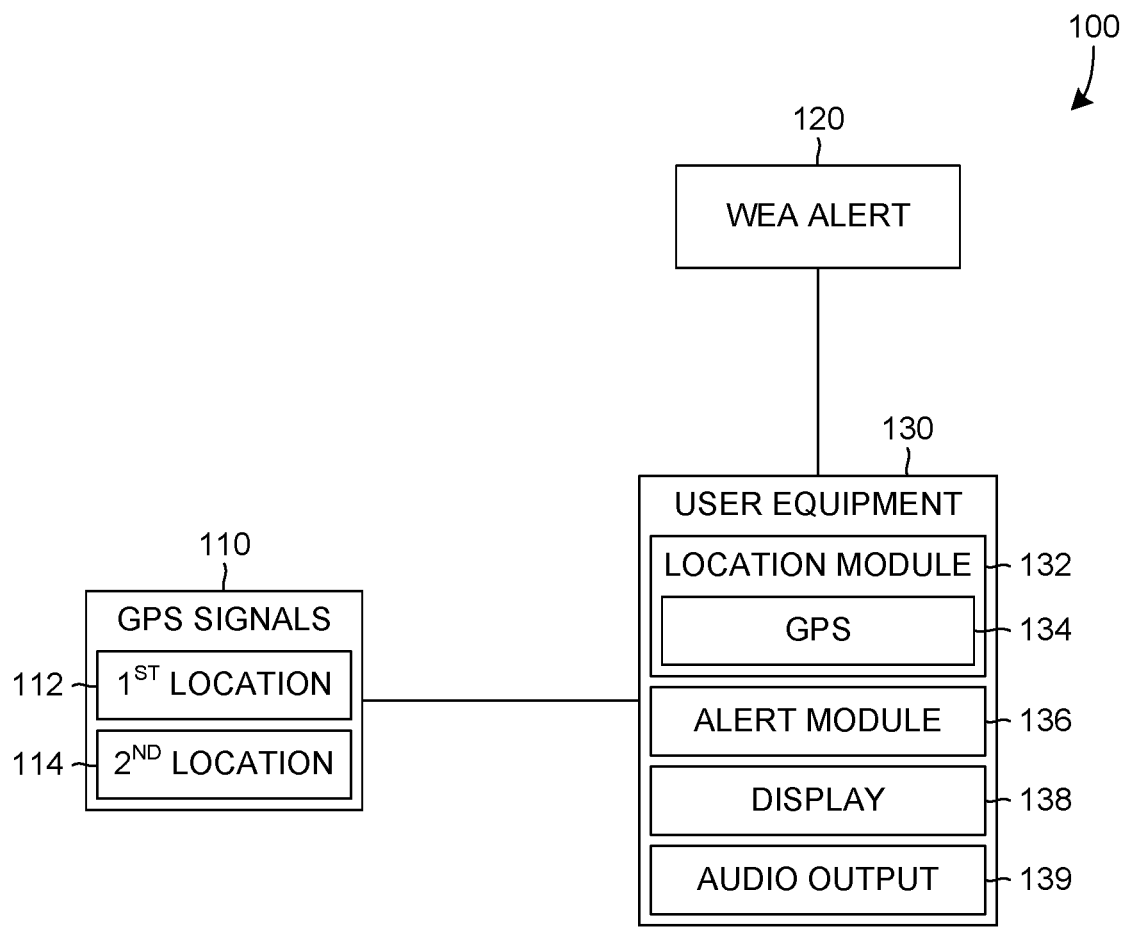
FIG. 1 is an example system for testing the output of geofenced alerts.

The described systems and methods of testing geofenced alerts allow system infrastructure, user equipment, or both, to be tested to verify the proper handling and response to emergency alerts and informational transmissions, such as Wireless Emergency Alerts (WEA), that include a defined, geofenced area in which user equipment should output the received emergency alert transmission. In emergency situations, information can be distributed to a populace using a WEA alert, which can include a geofenced geographical area, so that user equipment within the geofenced area outputs the alert. This targeted approach of emergency alert transmissions can assist with ensuring that the people that need to receive and possibly take action in response to the emergency alert are the people who actually receive the emergency alert. The WEA alert can be transmitted across a larger geographical area than the geofenced area of the WEA alert so that user equipment that may enter the geofenced area also receives the alert that can be displayed upon entry into the geofenced area. In this manner, user equipment that enter the geofenced area while the alert is valid will also output the WEA alert.

Testing is paramount to a properly operating emergency alert system, including those with defined geofenced areas, such as the systems and methods disclosed herein. Testing should be performed to verify that the WEA alerts are received by the user equipment, and that the user equipment output the WEA alert when that user equipment is located in the geofenced area associated with the WEA alert. Failure of proper operation of such an emergency alert system could cause user equipment that should output the alert to fail to do so, which could lead to bad outcomes for people operating the user equipment. The user equipment needs to output the WEA alert when the user equipment is located in the geofenced area so that users are properly notified of the situation associated with the WEA alert.

In some situations, the user equipment can be located within the geofenced area when the WEA alert is transmitted, so the user device can be expected to promptly output the alert when the WEA alert is received by the user equipment. In other situations, the user equipment can receive the WEA alert transmission and be outside of the geofenced area, so the user equipment would not output the alert. However, user equipment located initially outside of the geofenced area of the WEA alert can transit into the geofenced area after the WEA alert has been transmitted and while the WEA alert is still active, so the user equipment would be expected to output the alert.

In all situations, when the WEA alert is received by the user equipment, the user equipment will need to process the WEA alert and determine if the alert should be output. To do this, the user equipment can use various location sensors and systems, such as Global Positioning System (GPS) sensors, to determine its current geographical location based on received geographical signals, such as GPS signals The user equipment can compare its determined location to the geofenced area of the WEA alert to determine if the WEA alert should be output by the user equipment. While the WEA alert is active, the user equipment can be instructed to periodically check its current location against that of the geofenced area of the WEA alert to determine if the alert should be output. The instruction to check the user equipment location, the schedule of checking the user equipment location, or both, can be included in the WEA alert or can be a predetermined part of the processing of WEA alerts by the user equipment.

To test the situation in which the user equipment transits into the geofenced area after the WEA alert has been transmitted, the user equipment is placed within a testing environment. The testing environment isolates the user equipment from other external signals or transmissions so that the user equipment is receiving only the signals and transmissions provided to it as part of the testing. Additionally, the signals and transmissions provided to the user equipment in the testing environment are also isolated from the external environment, which allows signals, such as WEA alerts, to be transmitted to the user equipment being tested and prevents those signals from being received by other devices in the external environment. This can prevent devices in the external environment from receiving erroneous signals, such as WEA alerts, which could cause confusion to users of those external devices.

As part of the testing process, the user equipment is provided a WEA alert and one or more GPS signals that correspond to various geographical locations. The user equipment can receive GPS signals associated with a first location so that the user equipment, using its onboard sensors and systems, determines it is geographically located at the first location. This causes the user equipment to act and respond as if it is located at the first location, even though the device is not physically at the first location. By providing GPS signals to the device to cause it to determine it is at one or more geographical locations, various location-based functions of the user equipment can be evaluated in the testing environment, such as the WEA alerts. The WEA alert can be transmitted and received by the user equipment. The WEA alert can include a geofenced area that does not include the first location where the user equipment has determined it is currently geographically located based on the provided GPS signals. The user equipment can then be provided GPS signals corresponding to a second location that is within the geofenced area of the WEA alert. Essentially, one location is within the geofenced area and the second location is not.

In response to the second location GPS signals, the user equipment is expected to determine that it is geographically located at the second location and compare its determined location to the geofenced area of the WEA alert. Since the second location is within the geofenced area, the user equipment should output the WEA alert, assuming the system is properly functioning. This can be verified in the testing environment and is indicative that the various elements of the system, such as the network infrastructure and user equipment, are properly handling or responding to the WEA alerts.

FIG. 1 illustrates an example WEA alert testing system 100 that includes GPS signals 110, a WEA alert 120 and a user equipment 130, such as a cellphone or mobile device, that is being tested. In the testing system 100, a response to the WEA alert 120, by the user equipment 130, can be monitored to determine if the user equipment 130 is responding properly to the WEA alert 120. During the testing, the GPS signals 110 are provided to the user equipment 130 to allow the user equipment 130 to determine its position based on the provided GPS signals 110, and the user equipment 130 can respond to the WEA alert 120 based on the location information associated with the WEA alert 120.

The user equipment 130 can include a location module 132, an alert module 136 and a display 138. The location module 132 can determine a geographical location of the user equipment 130, such as by using GPS sensors and systems 134. The alert module 136 can process a received WEA alert 120 and determine if an alert should be displayed based on the location of the user equipment 130, such as determined by the location module 132. WEA alerts can be received by the user equipment 130, such as by part of a transmission of the WEA alert 120 over an area. The received WEA alert 120 includes geographical information that defines an area, such as a geofenced geographical area, in which user equipment located within that area should display the WEA alert 120. The alert module 136 can process the received WEA alert 120 and compare the current location of the user equipment 130 to the geographical area of the WEA alert 120 to determine if the user equipment 130 is located within the WEA alert area or not. If the alert module 136 determines the user equipment 130 is within the WEA alert area, the user equipment 130 can output the WEA alert or an aspect of the WEA alert to a user of the user equipment 130, such as by the display 138, an audio output 139, a tactile output or a combination thereof. The WEA alert can include one or more aspects of the alert, such as a visual aspect or text message, an audio aspect or audio message, or a tactile aspect. The user equipment can output one or more aspects of the WEA alert to communicate the alert to a user of the user equipment.

The WEA alert 120 can be transmitted across a large geographical area that includes the specific geographical or geofenced area defined in the WEA alert 120. In this manner, the WEA alert 120 is likely to reach any user equipment in or near the geographical area of the alert, such as user equipment that may be traveling into or through the geographical area of the WEA alert 120. In an example situation, the user equipment 130 can be moving through an area in which the WEA alert 120 is transmitted, but the user equipment 130 may not be currently located in the geographical area defined by the WEA alert 120. In this case, while the user equipment 130 receives the WEA alert 120 transmission it does not cause the user equipment 130 to display the alert since the user equipment is not located in the WEA alert area.

In another example, if the user equipment 130 travels into the geographical area of the WEA alert 120 from outside the geographical area of the WEA alert 120, the alert module 136 can determine the user equipment 130 has now transited into the geographical area of the WEA alert 120, such as by comparing the geofenced or geographical area of the WEA alert 120 with the current location of the user equipment determined by the location module 132. When the alert module 136 determines the user equipment has transited into the geographical area of the WEA alert 120, the alert module 136 can cause the WEA alert 120 to be output. In this example, the user equipment 130 can repeatedly check the received WEA alert 120 information to determine if the WEA alert 120 should be output due to the user equipment relocating to the geographical area defined in the WEA alert 120. Alternatively or additionally, the WEA alert 120 can be repeated and can cause the user equipment 130 to check if its current location is within the geographical area of the WEA alert 120.

Testing user equipment 130, in a test environment, to see if it properly responds to the WEA alert 120 when the user equipment 130 transits into an area defined by the WEA alert 120 can be difficult. In the testing system 100, the user equipment 130 can be provided GPS signals 110 that the user equipment 130 can use to determine a location of the user equipment 130 based on the GPS signals 110. The GPS signals 110 can be captured and recorded in a general environment, such as at a first location 112 and a second location 114 within a community or elsewhere. These captured GPS signals 110 can be stored for reuse in future testing or for other purposes. In the testing environment, the recorded GPS signals 110 can be provided or replayed to the user equipment 130 to cause the user equipment 130 to determine it is located at the geographical location associated with the GPS signals 110 provided.

In an example test within the testing environment 100, GPS signals 110 corresponding to the first location 112 can be provided to the user equipment 130. The WEA alert 120 can be transmitted and received by the user equipment. The WEA alert 120 can include a defined geographical area associated with the WEA alert 120 and the defined geographical area can correspond to the second location 114. Since the user equipment 130 is currently being provided first location 112 GPS signals, an alert should not be output by the user equipment 130. The user equipment 130 can be checked to verify that the WEA alert is not being output, such as by the display 138 or audio output 139.

The second location 114 GPS signals can then be provided to the user equipment 130 to cause the user equipment 130 to determine, such as by the location module 132, that the user equipment 130 is geographically located at the second location 114. Since the WEA alert is associated with the second location 114, the user equipment should output the WEA alert after the user equipment 130 determines it is geographically located at the second location 114. To do so, the user equipment 130 can compare its position at the second location 114 with the geographical or geofenced area of the WEA alert 120. To verify that the user equipment 130 is properly responding to WEA alerts, the testing should show that the user equipment outputs the WEA alert 120 when the user equipment determines it is within the geofenced area of the WEA alert 120, whether by being located in or moving into the geofenced area, and otherwise does not output the WEA alert 120.

Figure 2A:
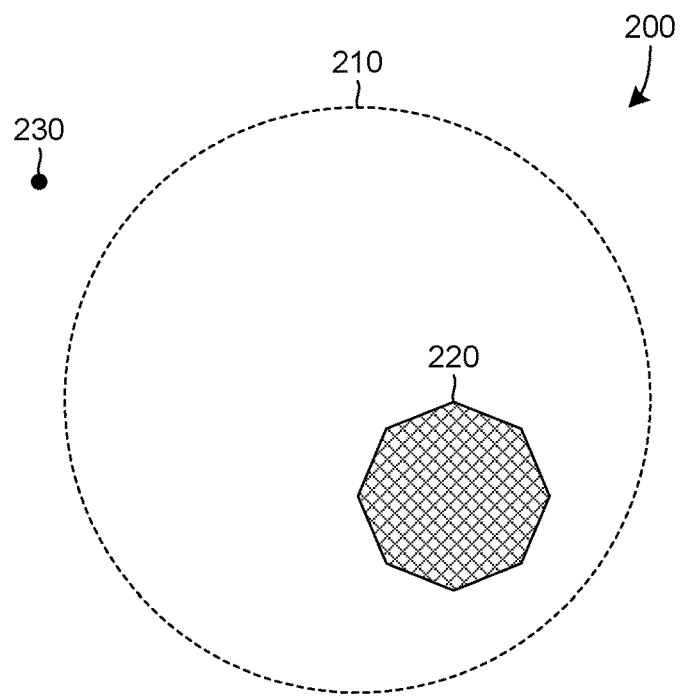
FIGS. 2A-2C are example environments for receiving and displaying geofenced alerts.
Figure 2B:
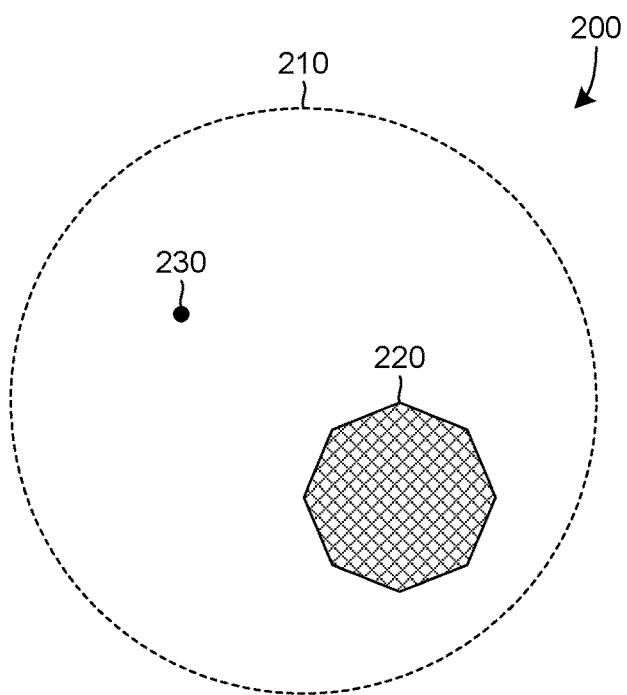
Figure 2C:
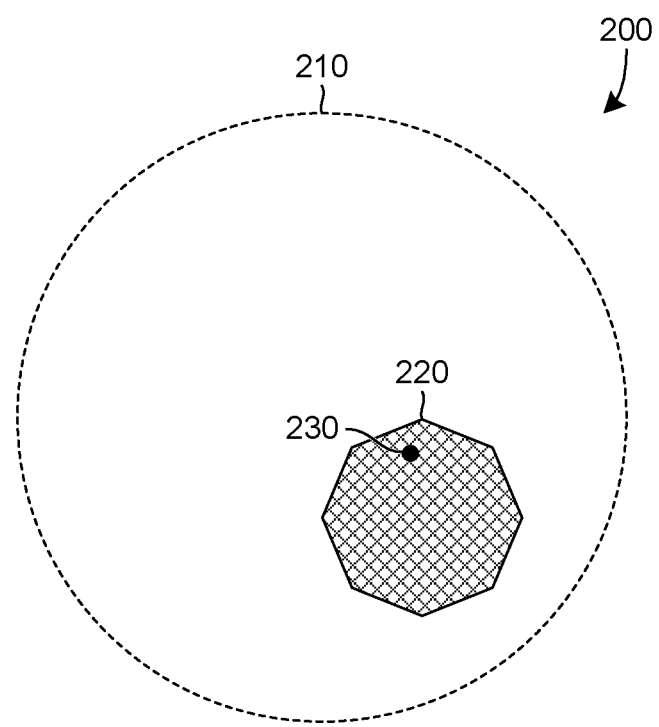

FIGS. 2A-2C illustrate example environments 200 of a location of user equipment 230 relative to the transmission coverage area 210 of a WEA alert and the geofenced defined area 220 of the WEA alert. The transmission coverage area 210 is the general geographical area in which the WEA alert is transmitted in order to reach user equipment 230 that might be currently located in the geofenced area 220 associated with the WEA alert, or user equipment 230 that might be located in the geofenced area 220 at a future time. As discussed above, user equipment that is within the transmission coverage area 210 evaluates its geographical location relative to the geofenced area 220 included in the WEA alert. If the user equipment determines it is located within the geofenced area 220, the alert can be output by the user equipment 230. In the examples shown, the transmission coverage area 210 is shown as a circular region. However, the overall shape of the transmission coverage area 210 is dependent on the coverage area of the transmitters, such as cell towers, that transmit the WEA alert. Each transmitter will have a coverage area that includes the range that their transmissions will extend to and various environmental factors, such as buildings and terrain, that block or hinder the transmissions. Additionally, the geofenced area 220 is shown as a polygon having vertices linked by line segments. In further examples or embodiments, the number of vertices or the shape of the geofenced area 220 can vary and can be shaped to cover a geographical area in which user equipment should receive and display the WEA alert.

In FIG. 2A, the example environment 200 has the transmission coverage area 210 that includes a portion that is designated as the geofenced area 220 associated with the WEA alert. User equipment that is located within the geofenced area 220 or other user equipment that enters the geofenced area 220 while the WEA alert is valid, will display the WEA alert to communicate to the user information associated with the geofenced area 220. Example information can include emergency information, such as evacuation instructions, shelter in place instructions, amber alerts, or other information regarding the emergency. In the example of FIG. 2A, the user equipment 230 is positioned outside of the transmission coverage area 210, so the user equipment 230 does not receive or output the WEA alert.

In FIG. 2B, the example environment 200 includes the user equipment 230 positioned in the transmission coverage area 210. In this example, the user equipment 230 receives the WEA alert, but does not output the WEA alert since the user equipment 230 is not located within the geofenced area 220 of the WEA alert. The user equipment 230 receives the WEA alert and compares its geographical location with that of the geofenced area 220. When the user equipment 230 determines it is not located within the geofenced area 220, it does not output the WEA alert.

In FIG. 2C, the example environment 200 includes the user equipment 230 positioned in the geofenced area 220. The user equipment 230 is located in the geofenced area 220 when the WEA alert is transmitted or could have transited into the geofenced area 220 while the WEA alert is valid. The user equipment 230 determines its geographical information and compares that to the geofenced area 220 of the WEA alert. Since the user equipment 230 is within the geofenced area 220, the user equipment 230 outputs the WEA alert to relay information to the user of the user equipment 230.

As shown in FIGS. 2A-2C, the user equipment needs to be able to determine its position relative to the geofenced area of the WEA alert to determine if the WEA alert should be output. Since such information needs to be reliably output to user equipment within the geofenced area, it is important to test various aspects of the system to help ensure the WEA alerts are received and processed in an appropriate manner by user equipment. A testing environment, such as described and shown in FIG. 1, can provide an environment in which various aspects of the system can be tested in controlled conditions without disseminating WEA alerts to the general public at large. In this manner, the infrastructure and various user equipment can be tested to verify that WEA alerts are properly delivered and processed to convey necessary information to users associated with the user equipment.

Figure 3:
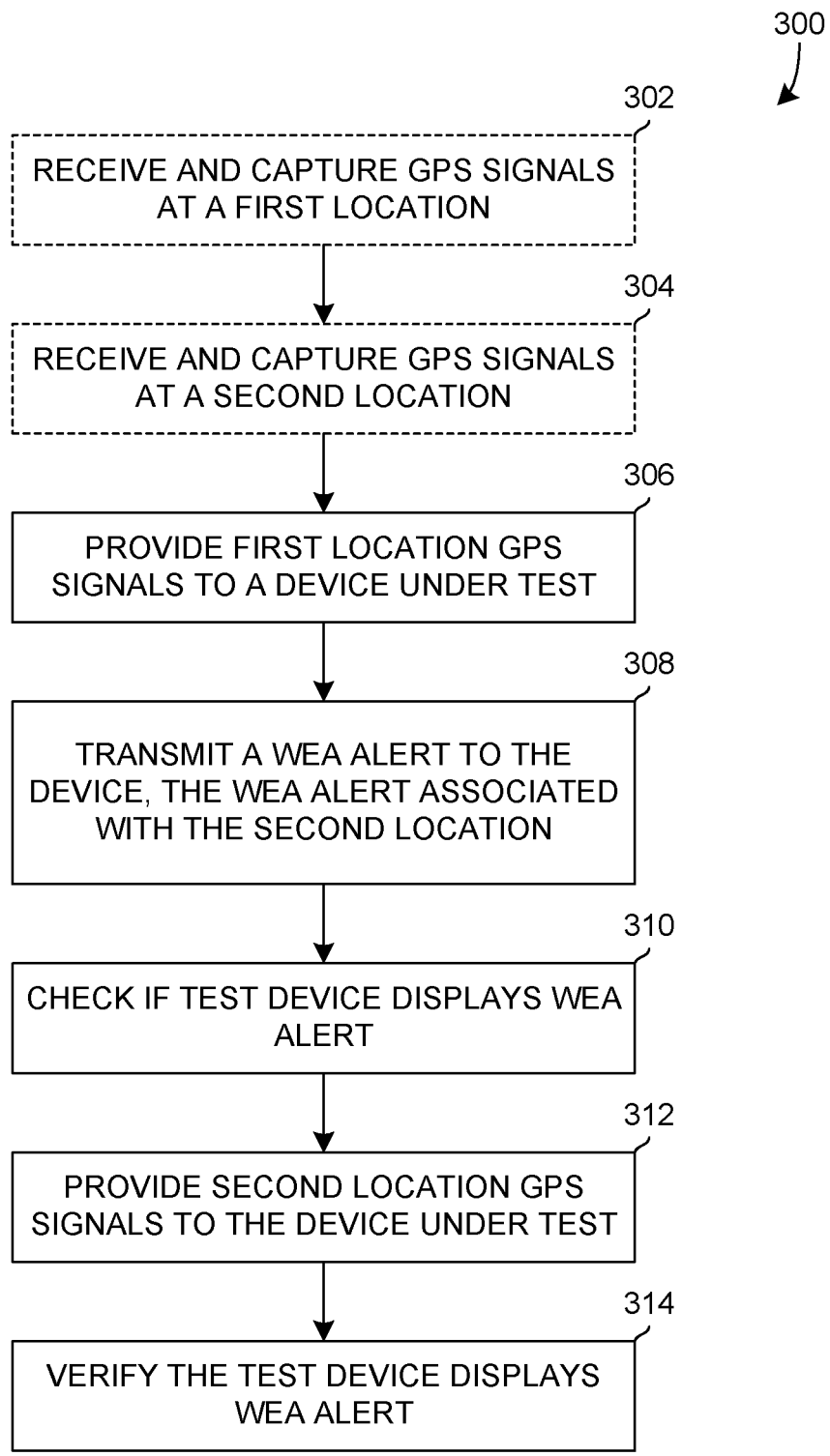
FIG. 3 is an example method of testing the output of geofenced alerts.

FIG. 3 is an example process 300 of testing the output of WEA alerts by user equipment. At 302, optionally, GPS signals can be received and captured at a first location. The captured GPS signals can be provided to user equipment to cause the user equipment to determine its geographical location as corresponding to the first location, which is the location at which the GPS signals were captured. Similarly, at 304 optionally, GPS signals can be received and captured at a second location and these GPS signals can be provided to the user equipment to cause the user equipment to determine its geographic location as corresponding to the second location. In this manner, GPS signals associated with two separate locations can be captured and later provided to user equipment in an ordered manner to cause the user equipment to determine it is located at the first location and has later transitioned to the second location.

At 306, the GPS signals associated with the first location, such as those captured at 302, are provided to the user equipment under test, such as a cellular or other mobile device. The device receives the first location GPS signals and determines it is geographically located at the first location. During the testing, the user equipment can be isolated from one or more external signals, such as GPS signals, so as not to influence or compromise the testing environment.

At 308, a WEA alert can be transmitted and received by the device. The WEA alert can include a geofenced area in which the WEA alert is to be displayed on user equipment. In the example, the WEA alert transmission has a geofenced area that is associated with the second location. As such, the user equipment under test should not output an alert based on the received WEA alert since the user equipment is receiving GPS signals associated with the first location. At 310, the user equipment under test can be checked to determine if the equipment displays the WEA alert.

At 312, the GPS signals associated with the second location, such as those captured at 304, are provided to the user equipment under test. The second location signals can be provided to the user equipment substantially concurrently with the first location signals ceasing to be provided to the user equipment. Alternatively, there can be a delay between ceasing to provide the first location signals and providing the second location signals. Since the second location is within the geofenced area of the WEA alert, the user equipment under test should display the WEA alert when it checks to determine if the user equipment under test is within the geofenced area of the WEA alert. At 314, the user equipment under test can be checked to verify that it is outputting the WEA alert because the user equipment is now determined to be within the geofenced area of the WEA alert based on the second location GPS signals being provided to the user equipment under test.

The testing method 300 allows the infrastructure and user equipment associated with transmitting and receiving WEA alerts to be tested to verify the WEA alerts are being properly handled and communicated, as needed. With the use of geofenced areas being associated with the WEA alerts, there is an increased reliance on user equipment properly handling the received WEA alerts to determine if the WEA alert should be output or not based on the geographical location of the user equipment. The described testing systems and methods outlined herein allow various aspects of the WEA alert system to be tested in a controlled environment that does not expose the general public to receiving WEA alert test messages.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A system for testing geofenced alerts, comprising:
   a user equipment;
   a testing environment configured to isolate the user equipment within the testing environment by preventing the user equipment from transmitting signals to and receiving signals from sources located outside of the testing environment;
   a signal transmitter configured to transmit geographic location test signals to the user equipment within the testing environment, the geographic location test signals including:
      a first geographic location test signal corresponding to a first geographic location physically located outside of the testing environment, and
      a second geographic location test signal corresponding to a second geographic location physically located outside of the testing environment, the second geographic location being different than the first geographic location;
   an emergency alert output configured to output an emergency alert test transmission to the user equipment within the testing environment, the emergency alert transmission including:
      a geofenced area that includes the first geographic location and does not include the second geographic location, and
      an emergency test alert associated with the geofenced area,
   wherein the user equipment has a processor configured to:
      receive the emergency alert test transmission from the emergency alert output,
      receive the first geographic test signal or the second geographic location test signal from the signal transmitter, and
      if the user equipment receives the first geographic location test signal, cause the user equipment to output the emergency test alert, and
      if the user equipment receives the second geographic location test signal, cause the user equipment to refrain from outputting the emergency test alert.

2. The system of claim 1, wherein the first geographic location test signal and the second stored geographic location test signal are Global Positioning System (GPS) signals.

3. The system of claim 1, wherein the first geographic location test signal and the second geographic location test signal are recorded at the first geographic location and the second geographic location, respectively.

4. The system of claim 1, wherein the emergency alert transmission is a Wireless Emergency Alert (WEA).

5. The system of claim 1, wherein the user equipment includes a location module configured to determine a location of the user equipment based on one or more received geographic location signals.

6. The system of claim 1, wherein the user equipment further comprises an emergency alert module to output the emergency test alert.

7. A method for testing geofenced alerts within a testing environment configured to isolate the user equipment within the testing environment by preventing a user equipment from transmitting signals to and receiving signals from sources located outside of the testing environment, the method comprising:
   transmitting, from a signal transmitter to the user equipment:
      a first geographic location test signal corresponding to a first geographic location physically located outside of the testing environment boundary, or
      a second geographic location test signal corresponding to a second geographic location physically located outside of the testing environment boundary, the second geographic location being different than the first geographic location;
   outputting, from an emergency alert output to the user equipment an emergency alert transmission including:
      a geofenced area defined by a geofenced alert boundary that includes the first geographic location and does not include the second geographic location, and
      an emergency test alert associated with the geofenced area; and
   causing the user equipment to:
      output the emergency test alert if the user equipment receives the first geographic location test signal, or
      refrain from outputting the emergency test alert if the user equipment receives the second geographic location,
   wherein the signal transmitter and the user equipment are physically located within the testing environment.

8. The method of claim 7, wherein the emergency alert transmission is a Wireless Emergency Alert (WEA).

9. The method of claim 7, wherein the first geographic location test signal and the second stored geographic location test signal are Global Positioning Signals (GPS).

10. The method of claim 9, further comprising:
capturing and recording the first geographic location test signal at the first geographic location; and
capturing and recording the second geographic location test signal at the second geographic location; and
wherein the generating the first geographic location test signal and the generating the second geographic location test signal is a transmission of the recorded first and second geographic location signals.

11. The method of claim 7, wherein the first geographic location test signal is initially generated and then the second geographic location test signal is generated concurrently with the first geographic location test signal ceasing to be generated.

12. The method of claim 7, wherein the output of the emergency alert includes at least one of a visual output, an audible output, and a tactile output.

13. The system of claim 1, wherein the first geographic location is within a transmission coverage area capable of receiving the emergency alert.

14. The system of claim 6, wherein the emergency alert module includes a visual aspect, an audible aspect, a tactile aspect, or combinations thereof to output the emergency test alert.

* * * * *